United States Patent
Baughman et al.

(10) Patent No.: US 11,675,822 B2
(45) Date of Patent: Jun. 13, 2023

(54) COMPUTER GENERATED DATA ANALYSIS AND LEARNING TO DERIVE MULTIMEDIA FACTOIDS

(71) Applicant: International Business Machines Corporation, Armonk, NY (US)

(72) Inventors: Aaron K. Baughman, Cary, NC (US); Stephen C. Hammer, Marietta, GA (US); Corey B. Shelton, Marietta, GA (US); Nicholas Michael Wilkin, Atlanta, GA (US); Sara Perelman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 16/940,306

(22) Filed: Jul. 27, 2020

(65) Prior Publication Data
US 2022/0027550 A1    Jan. 27, 2022

(51) Int. Cl.
G06F 16/34 (2019.01)
G06T 11/60 (2006.01)

(52) U.S. Cl.
CPC ........... G06F 16/345 (2019.01); G06T 11/60 (2013.01)

(58) Field of Classification Search
None
See application file for complete search history.

(56) References Cited

U.S. PATENT DOCUMENTS

| | | | |
|---|---|---|---|
| 7,640,272 B2 | 12/2009 | Mahajan | |
| 8,977,953 B1 | 3/2015 | Pierre | |
| 9,454,524 B1 * | 9/2016 | Modani | G06V 10/7715 |
| 2002/0051077 A1 * | 5/2002 | Liou | H04N 21/8549 |
| | | | 348/E7.063 |
| 2006/0165379 A1 * | 7/2006 | Agnihotri | G06F 16/786 |
| | | | 348/E7.071 |
| 2007/0033170 A1 * | 2/2007 | Sull | G11B 27/28 |
| 2007/0136280 A1 * | 6/2007 | Li | G06F 16/313 |
| | | | 707/E17.084 |
| 2007/0162447 A1 | 7/2007 | Joshi | |
| 2008/0163283 A1 | 7/2008 | Tan | |

(Continued)

FOREIGN PATENT DOCUMENTS

EP    1889233 A2    2/2008

OTHER PUBLICATIONS

Chowdhury, et al., "VIZ-Wiki: Generating Visual Summaries to Factoid Threads in Community Question Answering Services", WWW '18: Companion Proceedings of the The Web Conference, Apr. 2018, pp. 231-234, <https://dl.acm.org/citation.cfm?id=3186986>.

(Continued)

*Primary Examiner* — Augustine K. Obisesan
(74) *Attorney, Agent, or Firm* — Michael A. Petrocelli

(57) ABSTRACT

A relevant factoid(s) related to multimedia data is generated by splitting a multimedia item into a media component and a text component. Text information is retrieved relevant to text data from the text component using a query. The text information is summarized into a factoid. Source data is checked for an image based on the multimedia component. A current state image is generated from the image. The factoid and the current state image are combined into a combined factoid, and the combined factoid is stored for sending to a media outlet for presentation on a media format.

21 Claims, 9 Drawing Sheets

(56) References Cited

U.S. PATENT DOCUMENTS

| | | | |
|---|---|---|---|
| 2014/0132836 A1* | 5/2014 | Jung | H04N 21/8549 725/114 |
| 2015/0074127 A1 | 3/2015 | Cherwinka | |
| 2015/0348131 A1* | 12/2015 | Lee | G06Q 30/0631 705/26.7 |
| 2016/0342685 A1 | 11/2016 | Basu | |
| 2016/0342895 A1 | 11/2016 | Gao | |
| 2018/0322155 A1 | 11/2018 | Alonso | |
| 2018/0336183 A1 | 11/2018 | Lee | |
| 2019/0325628 A1 | 10/2019 | Dubey | |

OTHER PUBLICATIONS

Chuklin, et al,. "Good Abandonments in Factoid Queries", WWW '12 Companion: Proceedings of the 21st International Conference on World Wide Web, Apr. 2012, pp. 483-484, <https://dl.acm.org/citation.cfm?id=2188088>.

Guy, et al., "The Factoid Queries Collection", SIGIR '16: Proceedings of the 39th International ACM SIGIR conference on Research and Development in Information Retrieval, Jul. 2016, pp. 717-720, <https://dl.acm.org/citation.cfm?id=2914676>.

Meghdadi, et al., "Interactive Exploration of Surveillance Video through Action Shot Summarization and Trajectory Visualization", IEEE Transactions on Visualization and Computer Graphics, vol. 19, No. 12, Dec. 2013, pp. 2119-2128, <https://ieeexplore.ieee.org/document/6634090>.

Mell et al., "The NIST Definition of Cloud Computing", National Institute of Standards and Technology, Special Publication 800-145, Sep. 2011, 7 pages.

Peled, Lotem, "AI Translation of Online Sarcasm for Sales Research. No Kidding", Enterprise AI | Advanced Computing in the Age of AI, Apr. 25, 2017, 4 pages, <https://www.enterpriseai.news/2017/04/25/ai-translation-online-sarcasm-sales-research-no-kidding/>.

Yulianti, et al., "Using Semantic and Context Features for Answer Summary Extraction", ADCS '16: Proceedings of the 21st Australasian Document Computing Symposium, Dec. 2016, pp. 81-84, <https://dl.acm.org/citation.cfm?id=3015031>.

Zong, et al., "An Answer Extraction Method Based on Discourse Structure and Rank Learning", 2011 7th Internationa Conference on Natural Language Processing and Knowledge Engineering, pp. 132-139, <https://ieeexplore.ieee.org/document/6138181>.

* cited by examiner

COMPUTER GENERATED DATA ANALYSIS AND LEARNING TO DERIVE MULTIMEDIA FACTOIDS

BACKGROUND

The present disclosure relates to computer generated data analysis of multimedia content and generating multimedia factoids, and more specifically, generating multimedia factoids using a computer-generated learning model.

Multimedia content including videos and images can include information about subjects, peoples, and for example, celebrities, news stories, and more. Converting a multimedia source into one or more factoids can be challenging. For example, a multimedia source can be old and therefore have non-current information. In another example, a multimedia source can be inaccurate, and therefore have the potential of perpetuating erroneous facts about a subject if published, such as if used in a news story.

SUMMARY

The present disclosure recognizes the shortcomings and problems associated with current methods and systems to for generating one or more factoids from multimedia content. In one embodiment according to the present invention, small snippets of text from natural language texts that can includes articles, blogs, tweets or encyclopedias and can be summarized into passages. The passages themselves can be rearranged into different prioritized sentences. These sentences can constitute factoids, and the quality of the factoids can be determined or estimated. In one example, using older images or videos about a subject and using them as relevant to the current time period can be problematic. For example, one problem includes using old or outdated images and/or text to generate a current factoid which includes text and images in multimedia content.

In one example according to the present invention a style transfer can be implemented into images and videos along with autoencoders to vector factoid architectures to create factoids. A probability with respect to the quality of the factoid can be used to determine the quality of the text. In one example, if the quality of text is low, the low-quality multimedia factoid can be fused with updated information to generate an updated current factoid. Thus, a vector to factoid model can continuously learn a word-based model based on natural language and sound.

In an aspect according to the present invention, a computer-implemented method for automatic retrieval of multimedia data and generation of a relevant factoid(s) related to the multimedia data includes splitting a multimedia item, received at a computer, into a media component and a text component. The method includes retrieving text information relevant to text data from the text component using a query, and summarizing the text information into a text factoid. The method includes checking source data of the media component for an image, and generating a current state image based on the image. The method includes combining the text factoid and the current state image into a multimedia factoid, and storing the multimedia factoid for sending the multimedia factoid to a media outlet for presentation on a media format.

In a related aspect, the source data includes date and weather conditions for the image.

In a related aspect, the received multimedia item includes a plurality of media components and text components.

In a related aspect, the method includes converting the textual data from the textual component into the query.

In a related aspect, the method includes converting the textual data from the textual component into the query using LDA (Latent Dirichlet Allocation).

In a related aspect, the method includes generating a link between the multimedia component and the textual component; and maintaining the link.

In a related aspect, the retrieved text information includes articles and documents in the public domain.

In a related aspect, the summarizing of the text information uses a multi-document summarization.

In a related aspect, the checking of the source data for the image includes training a multimedia-to-word model, which includes: associating image features of an image with image text and image topics; determining a time period for the image using the image text; and searching for and retrieving current images by comparing the time period for the image and objects recognized in the image to search for more current images, thereby obtaining the current images representative of the time period.

In a related aspect, the method includes verifying the current state images by authenticating time and date metadata regarding the current state images.

In a related aspect, the method includes checking the factoids for quality including measuring accuracy for the factoids.

In a related aspect, the retrieving of the text information and the checking of the source data for the image are done by simultaneous threads.

In a related aspect, the method includes generating multiple images related to the image based on the source data of the image; inputting the multiple images into a Convolutional Neural Network (CNN) determining differences between the multiple images; generating a vector for topics based on the determined differences; converting words associated with the topics into sentences to generate topic model sentences; editing the topic model sentences to generate final sentences; and using the final sentences in the combining of the factoid and the current state image in the combined factoid.

In a related aspect, the method includes: receiving media items, at the computer, the media items each having a multimedia component and a text component; splitting each of the media items into a multimedia component and a textual component, respectively; converting textual data from the textual component into a query for each of the media items; retrieving text information relevant to the textual data using the query for each of the media items; summarizing the text information for each of the media items into factoids, respectively; checking current date and weather conditions for images from multimedia components for each of the media items; generating a current state image based on each of the images; combining the factoids and the current state images into a combined factoid for each of the media items; and sending the combined factoids to one or more media outlets for presentation on one or more media formats.

In another aspect, a system for automatic retrieval of multimedia data and generation of a relevant factoid(s) related to the multimedia data, which includes a computer system. The computer systems includes; a computer processor, a computer-readable storage medium, and program instructions stored on the computer-readable storage medium being executable by the processor, to cause the computer system to perform the following functions to; split a multimedia item, received at a computer, into a media component and a text component; retrieve text information relevant to text data from the text component using a query; summarize the text information into a text factoid; check source data of the media component for an image; generate a current state image based on the image; combine the text factoid and the current state image into a multimedia factoid; and store the multimedia factoid for sending the multimedia factoid to a media outlet for presentation on a media format.

In a related aspect, the source data includes date and weather conditions for the image.

In a related aspect, the received multimedia item includes a media component and a text component.

In a related aspect, the system includes converting the textual data from the textual component into the query.

In a related aspect, the system includes converting the textual data from the textual component into query using LDA.

In another aspect, a computer program product for automatic retrieval of multimedia data and generation of a relevant factoid(s) related to the multimedia data, and the computer program product comprises a computer readable storage medium having program instructions embodied therewith. The program instructions executable by a computer to cause the computer to perform functions, by the computer, comprising the functions to: split a multimedia item, received at a computer, into a media component and a text component; retrieve text information relevant to text data from the text component using a query; summarize the text information into a text factoid; check source data of the media component for an image; generate a current state image based on the image; combine the text factoid and the current state image into a multimedia factoid; and store the multimedia factoid for sending the multimedia factoid to a media outlet for presentation on a media format.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
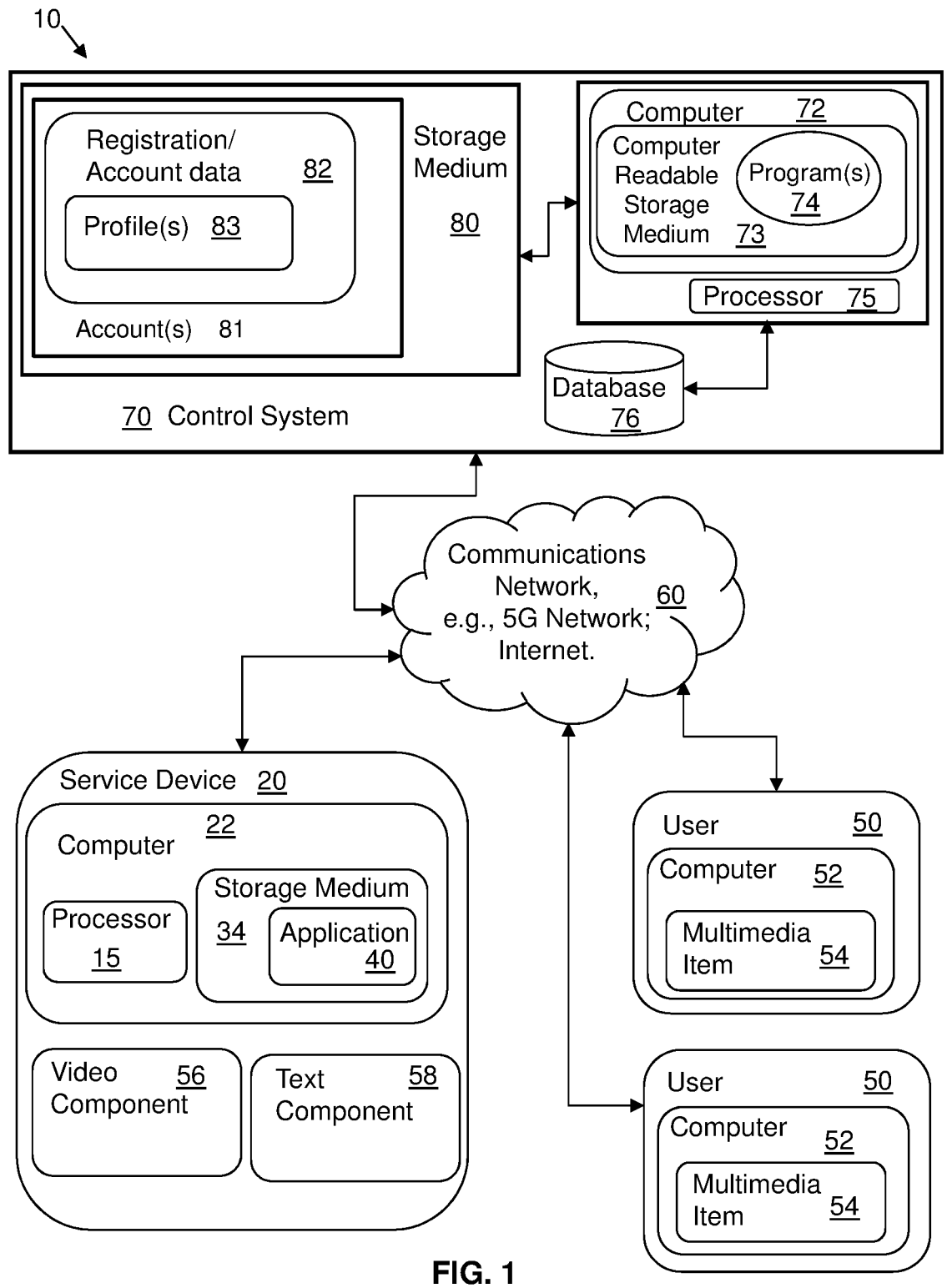
FIG. 1 is a schematic block diagram illustrating an overview of a system, system features or components, and methodology for automatic retrieval of media data and generation of a relevant factoid(s) related to the media data.
Figure 2:
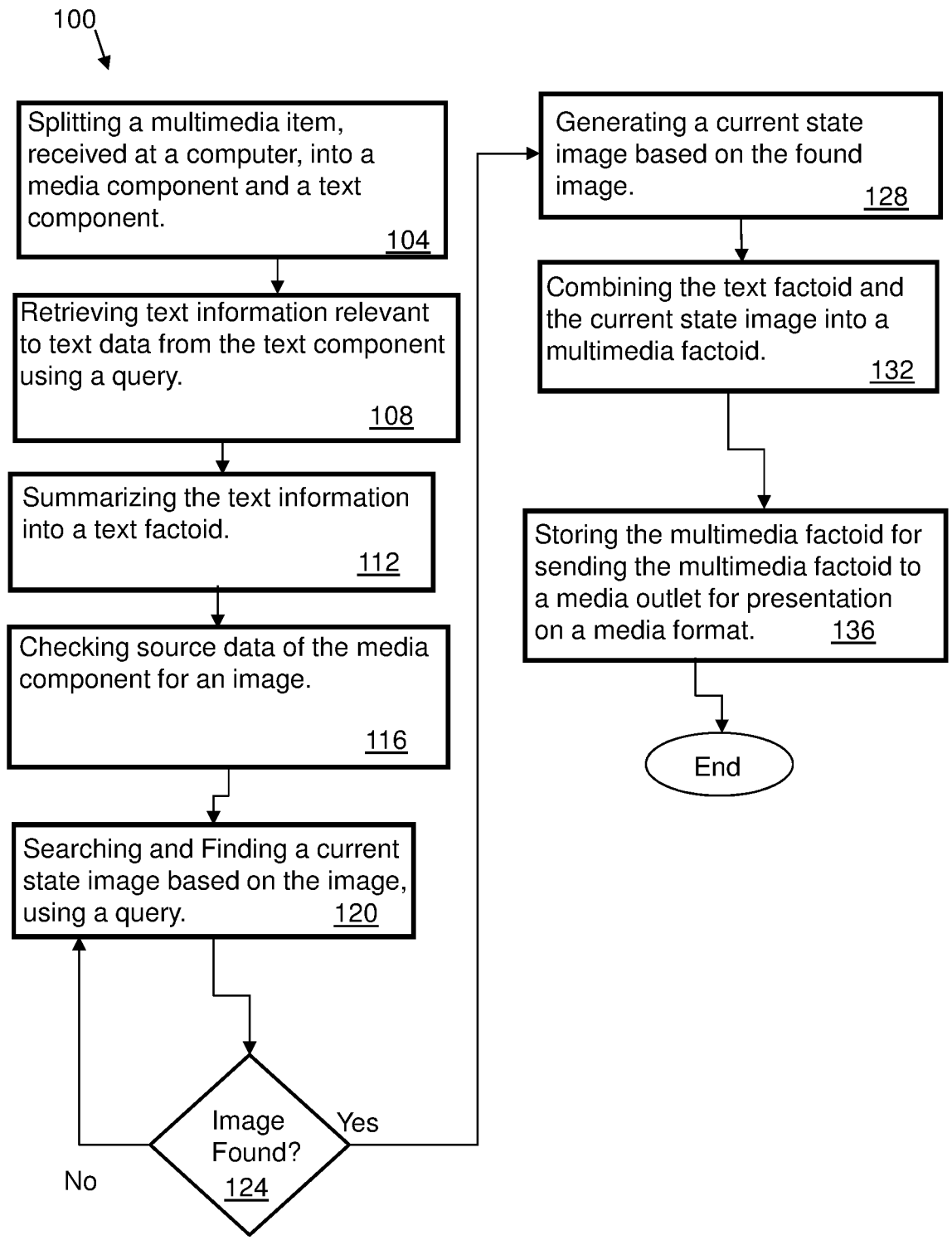
FIG. 2 is a flow chart illustrating a method and method functions, showing a series of operations, implemented using the system shown in FIG. 1, for automatic retrieval of media data and generation of a relevant factoid(s) related to the media data.

Referring to FIGS. 1 and 2, a method 100 (FIG. 2) with reference to a system 10 (FIG. 1) according to an embodiment of the present disclosure is provided for automatic retrieval of multimedia data and generation of a relevant factoid(s) related to the multimedia data. Multimedia data can include, for example, text, images, audio, video, and animation. In one example, multimedia data can include a video and the audio of the video transcribed to text, or in other words example, deriving text from a video. Such text can include, for example, captions, topics, keywords, or subjects. In one example a factoid can include one or more facts, summarized or briefly stated regarding an item or topic.

Thus, a factoid can be related to media data or a multimedia item such that the factoid can be text, or text and video, about an item, where, for example, the item is a topic, a subject, a person, a place or a thing. And the factoid can summarize aspects about or offer additional facts related to the item.

Referring to FIG. 2, the method 100 includes splitting a multimedia item 54, received at a computer 22, into a media component and a text component, as in block 104. For example, the multimedia item 54 can be divided into a media component, for example, a video component 56 and a text component 58. The video component 56 and text component 58 can be saved on a computer readable storage medium 34 communicating with the computer 22.

In one example, the multimedia item can be received at a service device 20. The service device can include the computer 22. The service device can be part of a service for providing multimedia factoids, and in one example, accessible using a website. The service device can be in electronic communication with one or more users, which can also be representatives of one or business with an interest in receiving updated multimedia factoids.

As shown in FIG. 2, the method further includes retrieving text information 312 (see FIG. 5) relevant to text data from the text component using a query 304, as in block 108. The text data can refer to the language in the text component, for example, the text data can include identifying words and phrases in the text component. A query 304 can be initiated to search for the text information 312. Further, the retrieving of the text information 312 can refer to extracting and identifying information from the text data 308, for example the text information can include the meaning of the words and phrases. In another example, the text data can include data from the text component such as identifying words and phrases that may be directed to information about a person, or a place or thing, or an issue. And in another example, the text information can include identifying the person, place or thing in the words and/or phrases, including a subject or issue in the text data. The subject or issues can be ascertained, for example, by word recognition and cognitive analysis of the text data using the computer.

In one embodiment, the method 100 according to an embodiment of the present disclosure, can be incorporated in one or more computer programs or an application 40 stored on an electronic storage medium 34, and executable by the processor 15, as part of the computer on the device 20. For example, a user 50 having a computer 52, and the computer can communicate with the service device 20. For example, two users with computers are shown in FIG. 1, however, one or more users can be part of the method. The application can be stored, all or in part, on a computer or a computer in a mobile device and at a control system communicating with the device, for example, using the communications network 60, such as the Internet. It is envisioned that the application can access all or part of program instructions to implement the method of the present disclosure. The program or application can communicate with a remote computer system via a communications network 60 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 7 and described in more detail in regards thereto referring to one or more computer systems 1010.

In one example, a control system 70 is in communication with the device 20, and the device 20 can include the application 40. The device 20 communicates with the control system 70 using the communications network 60.

In another example, the control system 70 can have a front-end computer such as the service device 20, and a back-end computer embodied as the control system.

Also, referring to FIG. 1, the device 20 can include a computer 22, computer readable storage medium 34, and operating systems, and/or programs, and/or a software application 40, which can include program instructions executable using a processor 15. These features are shown herein in FIG. 1, and also in an embodiment of a computer system shown in FIG. 7 referring to one or more computer systems 1010, which may include one or more generic computer components.

Figure 7:
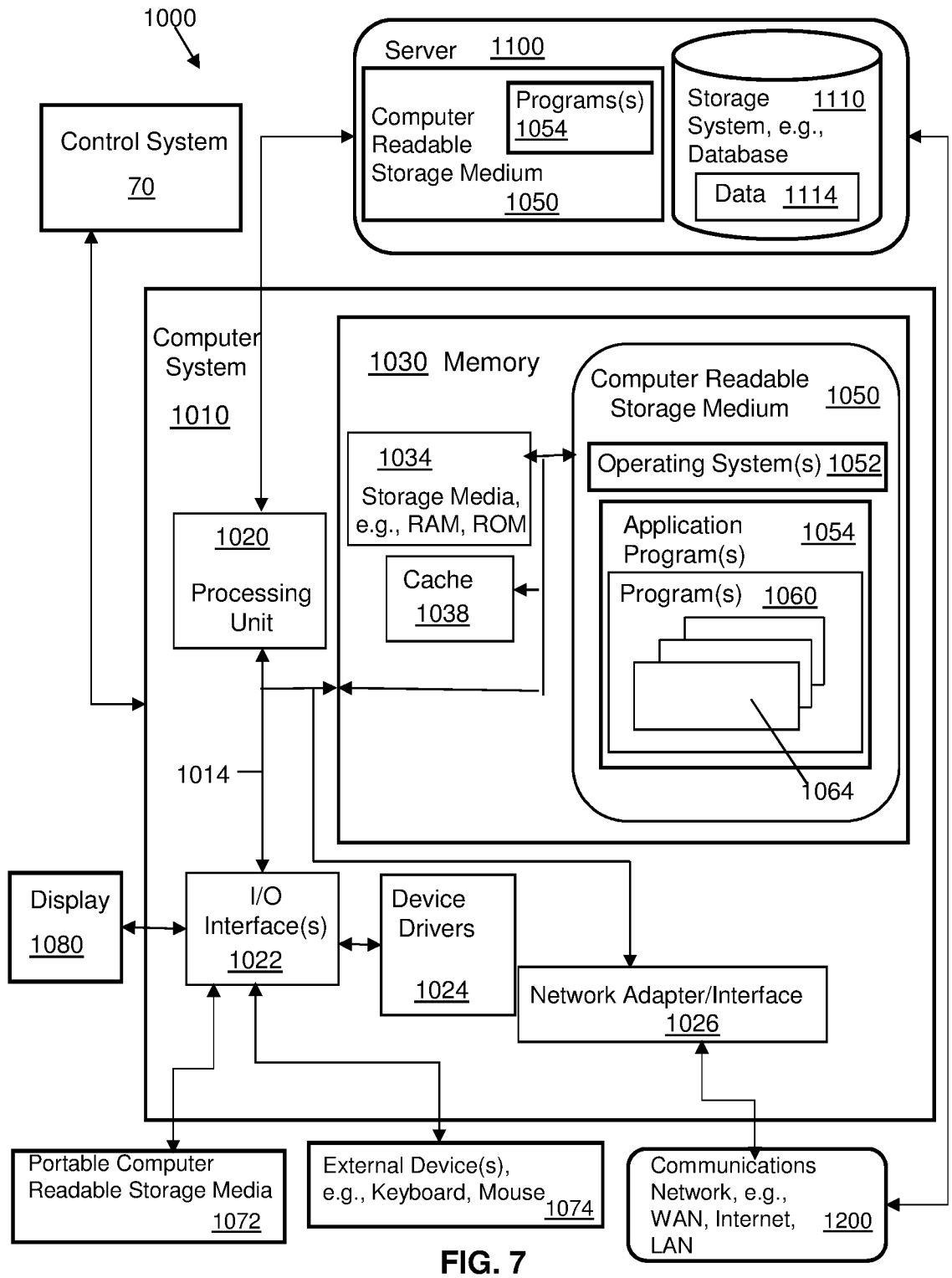
FIG. 7 is a schematic block diagram depicting a computer system according to an embodiment of the disclosure which may be incorporated, all or in part, in one or more computers or devices shown in FIG. 1, and cooperates with the systems and methods shown in FIGS. 1, 2, 3, 4, and 5.

In the embodiment of the present disclosure shown in FIGS. 1 and 2, a computer can be part of a remote computer or a remote server, for example, remote server 1100 (FIG. 7). In another example, the computer 72 can be part of a control system 70 and provide execution of the functions of the present disclosure. In another embodiment, a computer 22 can be part of a device 20 and provide execution of the functions of the present disclosure. In still another embodiment, parts of the execution of functions of the present disclosure can be shared between the control system computer and the device computer, for example, the control system function as a back end of a program or programs embodying the present disclosure and the device computer functioning as a front end of the program or programs.

In one example, the computer 22 can be part of the device 20, in another example, a remote computer can communicate with the mobile device. In another example, a mobile device and a remote computer can work in combination to implement the method of the present disclosure using stored program code or instructions to execute the features of the method(s) described herein. In one example, the device 20 can include a computer 22 having a processor 15 and a storage medium 34 which stores an application 40. The application can incorporate program instructions for executing the features of the present disclosure using the processor 15. In another example, the device 20 application 40 can have program instructions executable for a front end of a software application incorporating the features of the method of the present disclosure in program instructions, while a back end program or programs 74, of the software application, stored on the computer 72 of the control system 70 communicates with the mobile device computer and executes other features of the method. The control system 70 and the mobile device 20 can communicate using a communications network 60, for example, the Internet.

Returning to FIG. 2, the method 100 includes summarizing the text information into a text factoid 316, as in block 112. The method can use the retrieved text data and text information to generate a text factoid 316, for example, a text summarization of the text information. In another example, the generation of text factoid can include a text summarization of the text information wherein the text information includes an article or a document, that is, a source or source material. Thereby, a text factoid can be generated from a text summarization of an article, or a document, or another source's or source material's information (also referred to as a source article, or a source document, or a source of information, or source material).

The method 100 includes checking source data 320 of the video component 56 for an image, as in block 116. The media component, embodied as a video component 56, can include source data 320, wherein, for example, the source data includes an image.

The method 100 includes generating a current state image 324 based on the image, in one example, by searching and finding a current state image 324 based on the image, as in block 120. In one example, the method can search for a current state image 324 for the image or based on the image. For example, a current state image which is related to the image, for instance, an updated image of the image from the source data 320.

When the image not found, the method returns to block 120 to continue searching and finding a current state image. When an image is found, the method continues to block 128.

The method can thus generate a current state image based on the found image, as in block 128. For example, the method can use an updated image as a result of searching and finding a current state image in block 120. And/or, for instance, the method can edit or modify a found image to update the image or use a combination of images.

The method 100 includes combining the text factoid and the current state image into a multimedia factoid 328, as in block 132. The current state image and the text factoid are combined into a multimedia factoid 328.

The method 100 includes storing the multimedia factoid 328 for sending the multimedia factoid to a media outlet for presentation on a media format, as in block 136. In one example, a multimedia factoid can be stored on the computer or a server. In another example, the multimedia factoid can be stored on the computer 72 on the control system, and in another example, it can be stored on a remote server. In one example, the multimedia factoid can be sent to a media outlet 332, such as a service provider for streaming content, or a print publisher, or posted on a website and accessible using the Internet.

Figure 3:
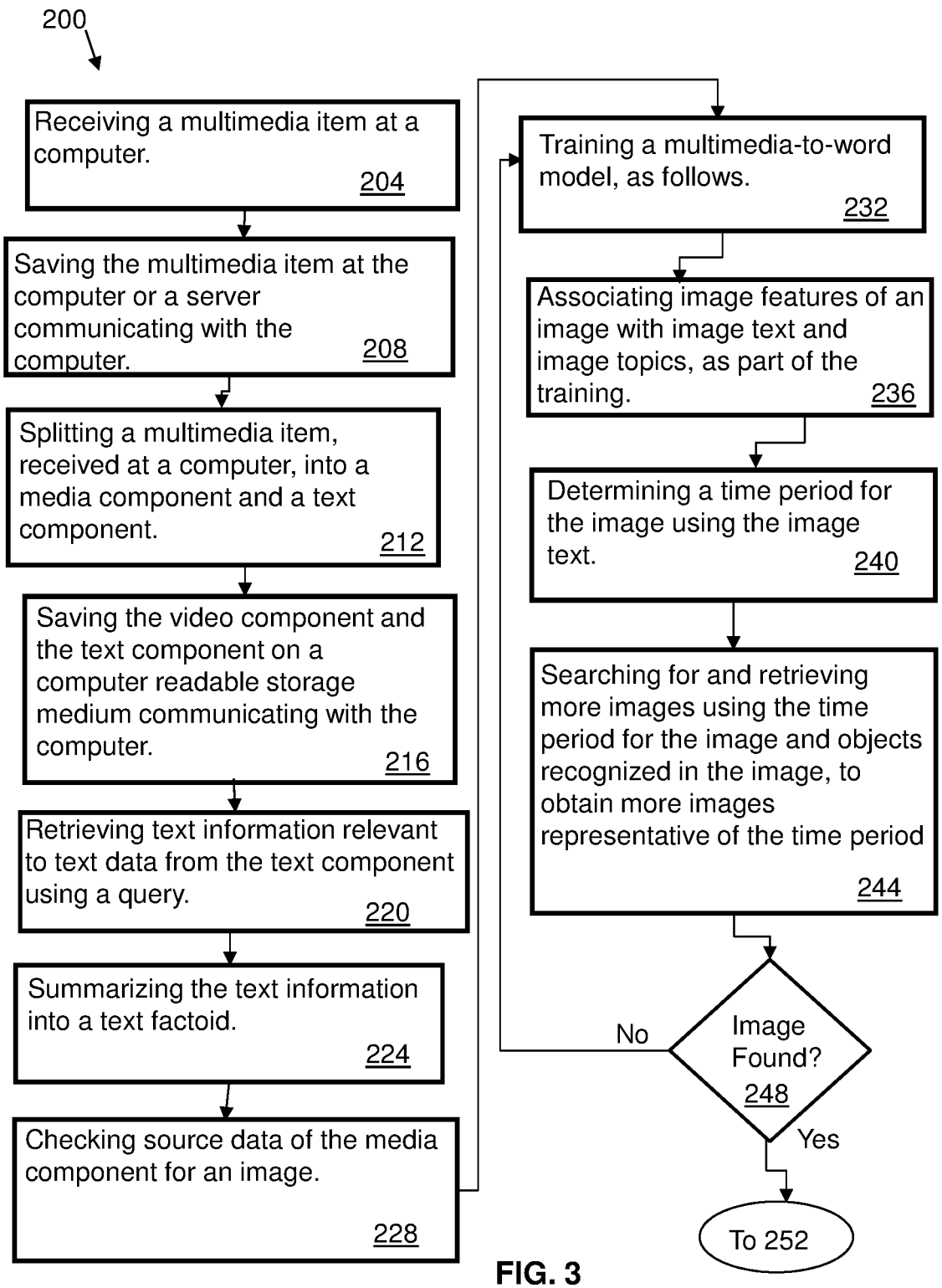
FIG. 3 is a flow chart illustrating another embodiment of a method according to the present disclosure, implemented using the system shown in FIG. 1, for automatic retrieval of media data and generation of a relevant factoid(s) related to the media data.
Figure 4:
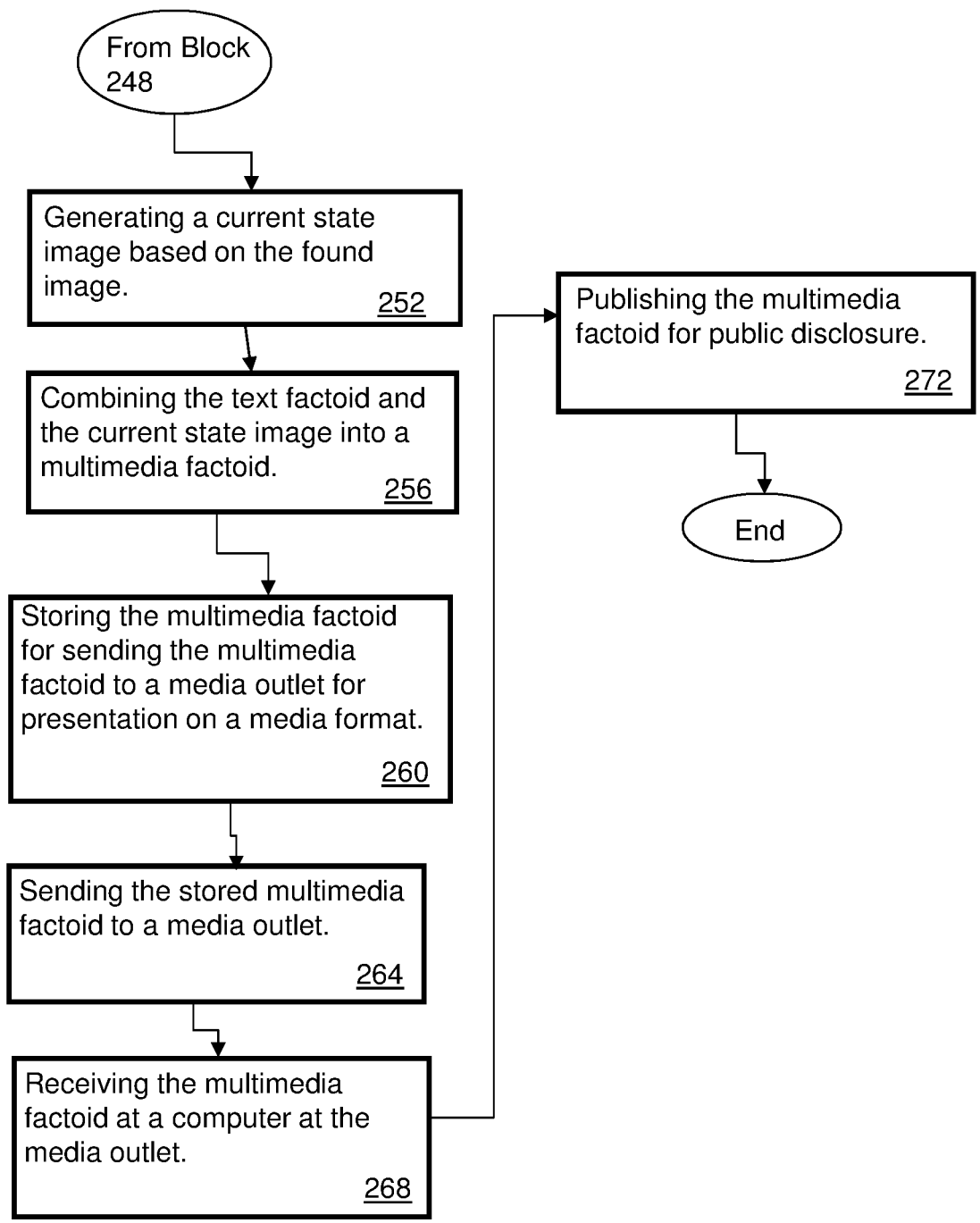
FIG. 4 is a flow chart continuing from the flow chart shown in FIG. 3 depicting a continuation of the method shown in FIG. 3, according to an embodiment of the invention.

In another embodiment according to the present disclosure, referring to FIG. 3, a method 200 includes receiving a multimedia item at a computer, at block 204. Some of the operations are the same or similar to the operations in the method 100 and are used herein in the method 200.

The method 200 includes saving the multimedia item at the computer or a server communicating with the computer on a computer readable storage medium, at block 208.

The method 200 includes splitting the multimedia item 54, received at the computer 22, into a media component and a text component, as in block 212. For example, the media component can include a video component 56 and text component 58.

The method 200 includes saving the video component and the text component on a computer readable storage medium 34 communicating with the computer 22, as in block 216.

The method 200 further includes retrieving text information 312 relevant to text data from the text component using a query 304, as in block 220.

The method 200 includes summarizing the text information into a text factoid 316, as in block 224. The method 200 includes checking source data of the video component 56 for an image, as in block 228. In one example, the source data can include date and weather conditions for the image. The media item can include a media component and a text component.

For example, the method 200 can further include converting the textual data from the textual component into the query. In another example, the method can include converting the textual data from the textual component into a query using LDA (Latent Dirichlet Allocation). In one example, using natural language processing, the latent Dirichlet allocation (LDA) can use a generative statistical model which ultimately can explain why some parts of the data are similar.

The method 200 includes maintaining a link between the media component and the textual component. For example, the link can be a code or a digital identifier identifying the media component and the textual component.

In one example, the method 200 can include retrieving text information which can include articles, also referred to as a source article(s), and documents or source documents, in the public domain.

The method 200 can include summarizing of the text information which can use a multi-document summarization. For example, a plurality of documents can be summarized into a single document.

The method 200 wherein the checking of the source data for the image includes training a multimedia-to-word model, as in block 232 which includes the following operations.

The method 200 includes associating image features of an image with image text and image topics, as part of the training, as in block 236. The method includes determining a time period for the image using the image text, as in block 240. The method includes searching for and retrieving current images by comparing the time period for the image and objects recognized in the image, and searching for more current images, thereby obtaining current images representative of the time period, as in block 244.

Referring to block 248, if the training in not completed, as for example, not having obtained current images, or not having obtained a threshold number of quality current images, the method returns to block 232. If the training is completed, as for example, having obtained current images, or having obtained a threshold number of quality current images, the method continues to block 252.

In one example, the current state images can be verified by authenticating time and date metadata regarding the current state images.

In another example, the method can include checking the factoids for quality including measuring accuracy for the factoids.

In one embodiment according to the present disclosure, the retrieving of the text information and the checking of the source data for the image are done by simultaneous threads.

The method 200 can thus generate a current state image based on the found image, as in block 252. The method 200 includes combining the text factoid and the current state image into a multimedia factoid, as in block 256. The current state image and the text factoid are combined into a multimedia factoid.

The method 200 includes storing the multimedia factoid for sending the multimedia factoid to a media outlet 332 for presentation on a media format, as in block 260. The method 200 include sending the stored multimedia factoid to a media outlet, as in block 264. For example, the media outlet can include an outlet for publishing information such as television, or a website. In one example, the media outlet can receive the multimedia factoid at a computer, as in block 268. In another example, the method can include publishing the multimedia factoid by the media outlet for public disclosure, as in block 272.

In one embodiment according to the present disclosure, the method can further comprise generating multiple images related to the image based on the source data of the image. The multiple images can be inputted into a Convolutional Neural Network (CNN). The method includes determining differences between the multiple images. A vector is generated for topics based on the determined differences. The method includes converting words associated with the topics into sentences to generate topic model sentences. The method includes editing the topic model sentences to generate final sentences, and using the final sentences in the combining of the factoid and the current state image in the combined factoid.

In one embodiment according to the present disclosure, the method can further comprise receiving media items, at the computer, and the media items can each having a multimedia component and a text component. The method can include splitting each of the media items into a multimedia component and a textual component, respectively. Textual data is converted from the textual component into a query for each of the media items. The method includes retrieving text information relevant to the textual data using the query for each of the media items. The text information is summarized for each of the media items into factoids, respectively. The method includes checking current date and weather conditions for images from multimedia components for each of the media items. A current state image is generated from each of the images. The method includes combining the factoids and the current state images into a combined factoid for each of the media items, and sending the combined factoids to one or more media outlets for presentation on one or more media formats.

In embodiments of the present disclosure, each of the media items are split into their multimedia and textual components. However, the link between the media types can be maintained to support multimodal training. The textual information can be converted into a query using LDA. Relevant articles, for example, news articles can be retrieved. The textual information can then be summarized through a multidocument summarization. The text summarizations are formed by existing art. Each of the factoids can then be measured for quality to ensure that they are semantically and surface formed factoids.

In one example, text information can be ingested into a multimedia-to-word model. The training can occur by associating the image features with the text, and iteratively to the topics. A factoid time period can be determined from the text. The time period of the factoids can be used to pull or find style images that represent the time period. A style query can be based on both the time period and objects that are recognized within the image.

In one example, at the same time, the multimedia part of the media is processed in a simultaneous thread. The current date and weather conditions are used to determine the appropriate style mixture. The style is mixed in with the current media to produce a timely based image.

The two generated images are then input into a CNN. The idea is that the difference between the images along with the hierarchical features will be learned and associated within a feature vector. The vector is then used within a vector to topic model. The highest probable words are then converted into sentences. The output from the topical model will be close approximate sentences lacking proper surface forms. Sentence templates can be used to rearrange the sentences.

The multimedia factoids along with the textual factoids can be combined together into a free-flowing document. The factoids can be combined and summarized into textual sentences that become the latest factoids.

Thereby, according to the embodiments of the present disclosure, in general, a method and system according to the present disclosure can include classifying images and video for presence and count of humans and other objects. The method can include validating target subject matter (human and/or object) is present in image or video, and summarizing images into factoids and summarizing videos into factoids. The method can include style transfer for images to produce time and setting relevant factoids, and style transfer for videos to produce time and setting relevant factoids. The method can include factoid vector model learning based on sound and natural language. The method can include generation of style queries based on time period and objects recognized in the source image. The method can include summarizing conversations, sentiment and generally, for example, trendy topics across social channels into factoids.

In a further example, small snippets of text from natural language texts that includes articles, blogs, tweets or encyclopedias can be summarized into passages. The passages themselves can be rearranged into different prioritized sentences. These sentences can constitute factoids if they are of high quality. However, much of the information about subjects, celebrities or late breaking stories are of the form of images and videos. Converting the multimedia source into factoids is a challenge which is solved by the present disclosure. In particular, taking older images or videos about a subject and making them relevant to the current time period is resolved by the present disclosure.

Figure 5:
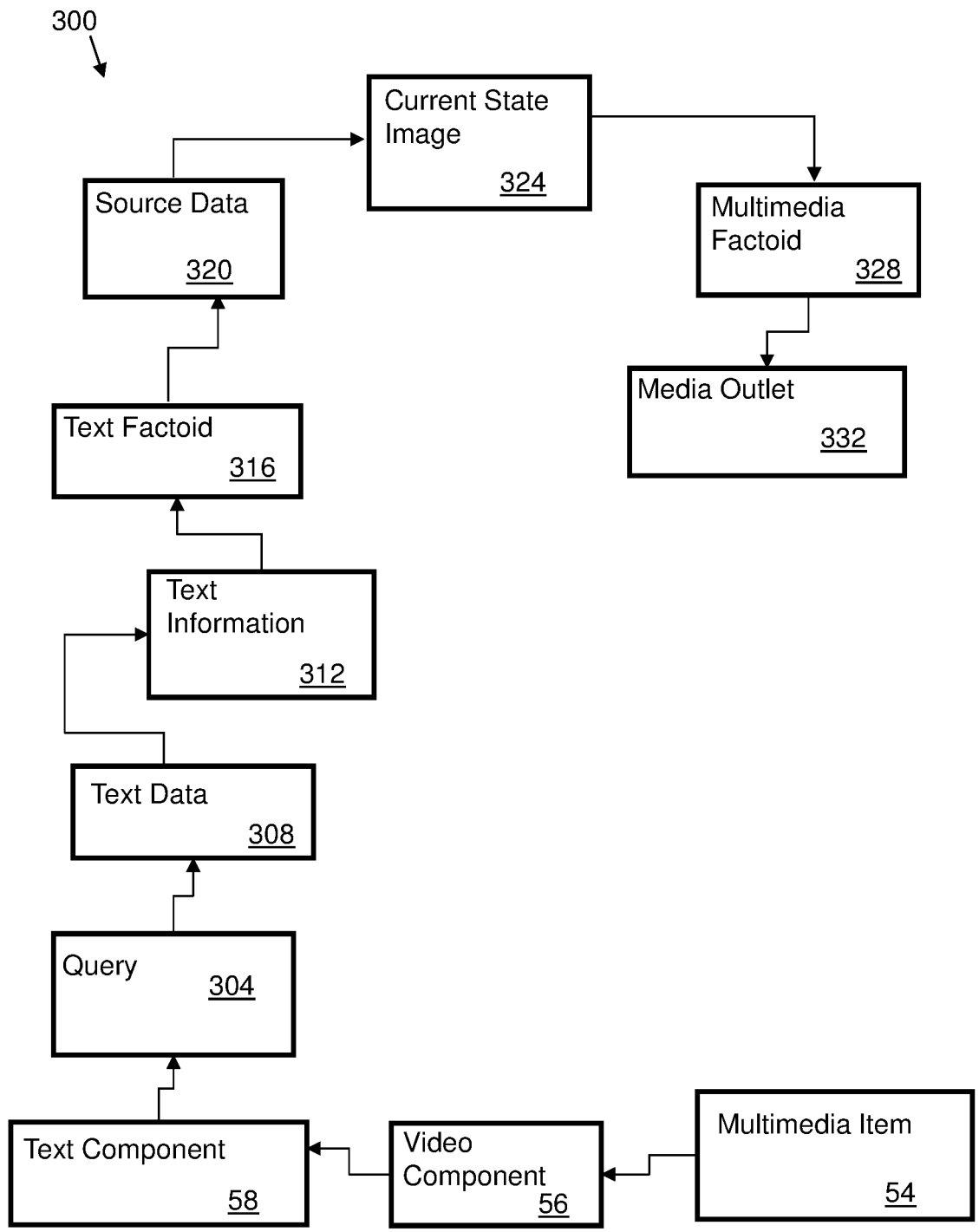
FIG. 5 is a functional schematic block diagram for instructional purposes illustrating functional features of the present disclosure associated with the embodiments shown in FIGS. 1, 2, 3, and 4, for automatic retrieval of media data and generation of a relevant factoid(s) related to the media data.

Examples and embodiments in the present disclosure are intended to be exemplary and non-exhaustive. Referring to FIG. 5, an exemplary system 300 includes example features and operations. It is understood that the features shown in FIG. 5 are functional representations of features according to the present disclosure. Such features are shown in embodiments of the systems and methods of the present disclosure for illustrative purposes to clarify the functionality of features and operations of the present disclosure.

Figure 6:
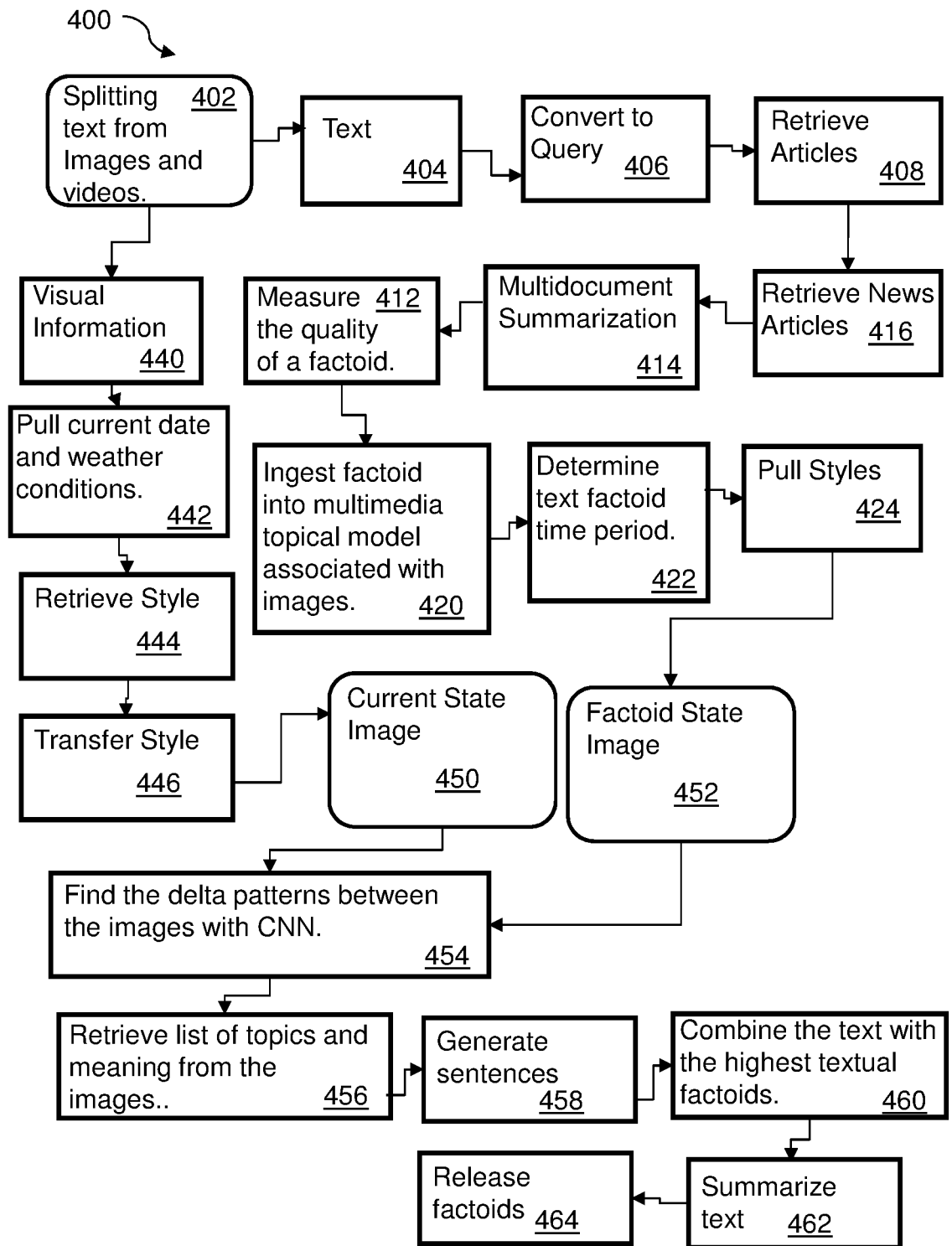
FIG. 6 is another embodiment of a functional schematic block diagram for instructional purposes illustrating functional features and operations of the present disclosure associated with the embodiments shown in FIGS. 1, 2, 3, and 4, for automatic retrieval of media data and generation of a relevant factoid(s) related to the media data.

Referring to FIG. 6, a functional block diagram according to one embodiment of the present disclosure includes a system 400 which includes operations, in a first operational avenue, the system includes splitting text 404 from images and videos 402. The system converts the text 404 to query 406 and retrieves articles 408 using the query and retrieves news articles 416. The system includes using the received articles and news articles and generates a multidocument summarization 414. The system includes measuring the quality of a factoid at block 412. The factoid is ingested 420 into a multimedia topical model associated with images. The system includes determining test factoid time period 422. The system includes pulling styles 424, and a factoid state image is generated 452. The system continues to find the delta patterns between the images with CNN 454.

In a second operational avenue, visual information 440 is extracted from the splitting of the text from the images 402. The system includes pulling current data and weather conditions 442 and retrieving a style 444, and transferring a style 446. The system includes generating current state image 450. The system continues to find the delta patterns between the images with CNN (Convolutional Neural Networks) 454. The system includes retrieving a list of topics and meaning from the images 456 to generate sentences 458. The text is combined with the highest textual factoids 460, the text is summarized 462 and the factoid(s) is released 464.

Thereby, by way of the embodiments of the present disclosure, the method and system uses style transfer into images and videos along with autoencoders to vector to factoid architectures to create factoids. A probability with respect to the quality of the factoid can determine the quality of the text. If the quality of the text is low, the invention will fuse the low-quality multimedia factoid to seed traditional based factoids. The vector to factoid model can continuously learn a precise word based model based on natural language and sound. Thereby, by way of the present disclosure, the embodiments according to the present disclosure can include classifying images and video for presence and count of humans and other objects; validating target subject matter (human and/or object) is present in image or video; images summarized into factoids; videos summarized into factoids; style transfer for images to produce time and setting relevant factoids; style transfer for videos to produce time and setting relevant factoids; factoid vector model learning based on sound and natural language; generation of style queries based on time period and objects recognized in the source image; and summarizing conversations, sentiment and general trendy topics across social channels into factoids.

The method according to the present disclosure, can include a computer for implementing the features of the method, according to the present disclosure, as part of a control system. In another example, a computer as part of a control system can work in corporation with a mobile device computer for implementing the features of the method according to the present disclosure. In another example, a computer for implementing the features of the method can be part of a mobile device and thus implement the method locally.

Specifically, regarding the control system 70, the device(s) 20 of one or more users 14 can be in communication with the control system 70 via the communications network 60. In the embodiment of the control system shown in FIG. 1, the control system 70 includes a computer 72 having a database 76 and one or more programs 74 stored on a computer readable storage medium 73. In the embodiment of the disclosure shown in FIG. 1, the devices 20 communicate with the control system 70 and the one or more programs 74 stored on a computer readable storage medium 73. The control system includes the computer 72 having a processor 75, which also has access to the database 76.

The control system 70 includes a storage medium 80 for maintaining a registration 82 of users and their devices for content analysis 228. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, the device 20, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of devices 20 having the application 40. The application 40 is stored on the devices 20 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a device 20. It is envisioned that the control system 70 can not only store the profile of users, but in one embodiment, can interact with a website for viewing on a display of a device, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Referring to FIG. 7, an embodiment of a system or a computer environment 1000, according to the present disclosure includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
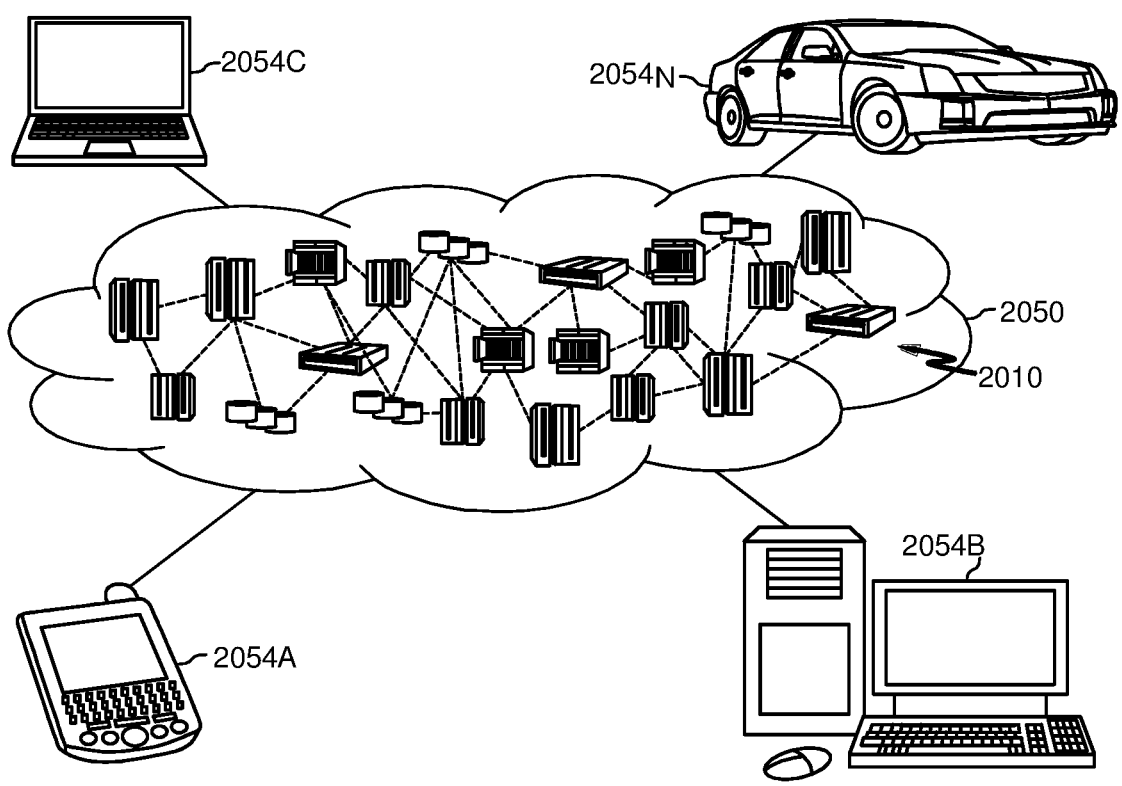
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
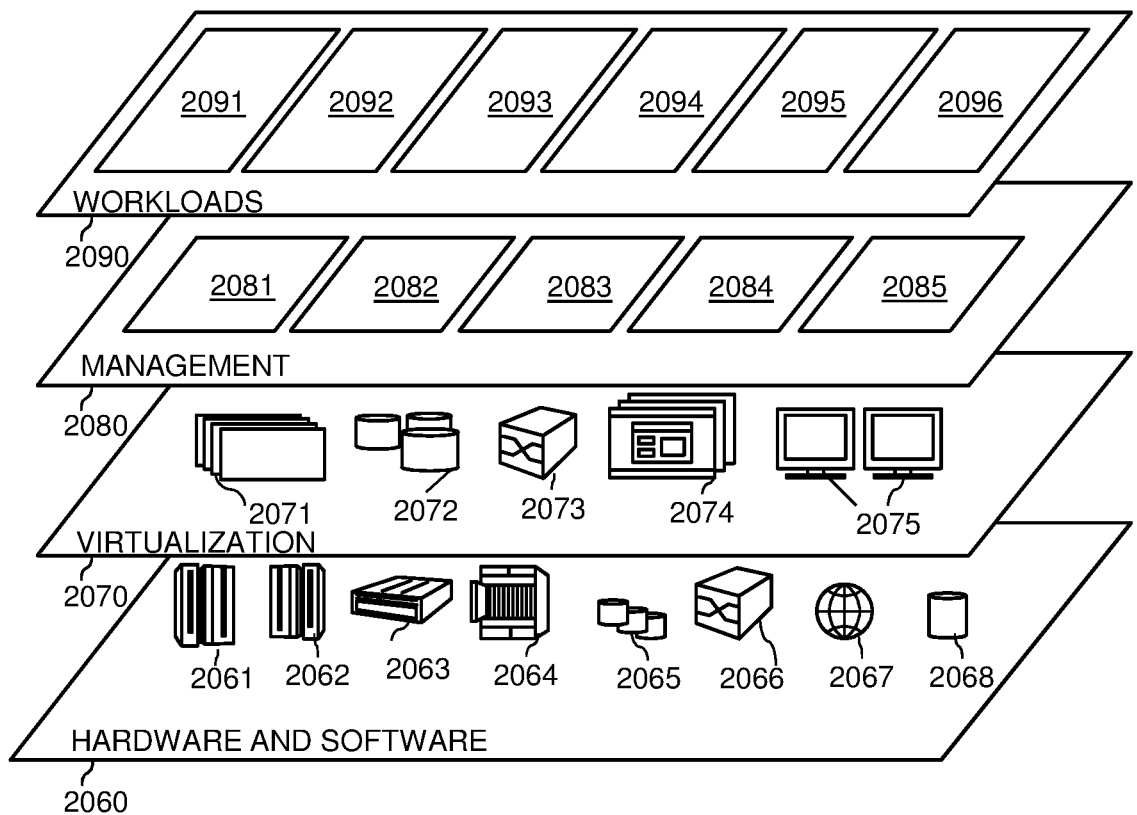
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and automatic retrieval of multimedia data and generation of a relevant factoid(s) related to the multimedia data 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic retrieval of multimedia data and generation of a relevant factoid(s) related to the multimedia data, comprising:
   splitting a multimedia item, received at a computer, into a media component and a text component;
   retrieving text information relevant to text data from the text component using a query;
   summarizing the text information into a text factoid;
   checking source data of the media component for an image;
   generating a current state image based on the image;
   combining the text factoid and the current state image into a multimedia factoid;
   storing the multimedia factoid for sending the multimedia factoid to a media outlet for presentation on a media format;
   generating multiple images related to the image based on the source data of the image;
   inputting the multiple images into a neural network;
   determining differences between the multiple images;
   generating a vector for topics based on the determined differences;
   converting words associated with the topics into sentences to generate topic model sentences, and generating final sentences; and
   using the final sentences in the combining of the factoid and the current state image in the combined factoid.

2. The method of claim 1, wherein the source data includes date and weather conditions for the image.

3. The method of claim 1, wherein the received multimedia item includes a plurality of media components and text components.

4. The method of claim 1, further comprising:
   converting the textual data from the textual component into the query.

5. The method of claim 1, further:
   converting the textual data from the textual component into the query using LDA (Latent Dirichlet Allocation).

6. The method of claim 1, further comprising:
   generating a link between the multimedia component and the textual component; and
   maintaining the link.

7. The method of claim 1, wherein the retrieved text information includes articles and documents in the public domain.

8. The method of claim 1, wherein the summarizing of the text information uses a multi-document summarization.

9. The method of claim 1, wherein the checking of the source data for the image includes training a multimedia-to-word model, which includes:
   associating image features of an image with image text and image topics;
   determining a time period for the image using the image text; and
   searching for and retrieving current images by comparing the time period for the image and objects recognized in the image to search for more current images, thereby obtaining the current images representative of the time period.

10. The method of claim 1, further comprising:
    verifying the current state images by authenticating time and date metadata regarding the current state images.

11. The method of claim 1, further comprising:
    checking the factoids for quality including measuring accuracy for the factoids.

12. The method of claim 1, wherein the retrieving of the text information and the checking of the source data for the image are done by simultaneous threads.

13. The method of claim 1, wherein the neural network is a Convolutional Neural Network (CNN), and the method further comprising:
    editing the topic model sentences to generate the final sentences.

14. The method of claim 1, further comprising:
    receiving media items, at the computer, the media items each having a multimedia component and a text component;
    splitting each of the media items into a multimedia component and a textual component, respectively;
    converting textual data from the textual component into a query for each of the media items;
    retrieving text information relevant to the textual data using the query for each of the media items;
    summarizing the text information for each of the media items into factoids, respectively;
    checking current date and weather conditions for images from multimedia components for each of the media items;
    generating a current state image based on each of the images;
    combining the factoids and the current state images into a combined factoid for each of the media items; and
    sending the combined factoids to one or more media outlets for presentation on one or more media formats.

15. A system for automatic retrieval of multimedia data and generation of a relevant factoid(s) related to the multimedia data, which comprises:
    a computer system comprising; a computer processor, a computer-readable storage medium, and program instructions stored on the computer-readable storage medium being executable by the processor, to cause the computer system to perform the following functions to;
    split a multimedia item, received at a computer, into a media component and a text component;

retrieve text information relevant to text data from the text component using a query;
summarize the text information into a text factoid;
check source data of the media component for an image;
generate a current state image based on the image;
combine the text factoid and the current state image into a multimedia factoid; and
store the multimedia factoid for sending the multimedia factoid to a media outlet for presentation on a media format;
generate multiple images related to the image based on the source data of the image;
input the multiple images into a neural network;
determine differences between the multiple images;
generate a vector for topics based on the determined differences;
convert words associated with the topics into sentences to generate topic model sentences, and generating final sentences; and
use the final sentences in the combining of the factoid and the current state image in the combined factoid.

16. The system of claim 15, wherein the source data includes date and weather conditions for the image.

17. The system of claim 15, wherein the received multimedia item includes a media component and a text component.

18. The system of claim 15, further comprising:
converting the textual data from the textual component into the query.

19. The system of claim 15, further comprising:
converting the textual data from the textual component into query using LDA.

20. A computer program product for automatic retrieval of multimedia data and generation of a relevant factoid(s) related to the multimedia data, the computer program product comprising a computer readable storage medium having program instructions embodied therewith, the program instructions executable by a computer to cause the computer to perform functions, by the computer, comprising the functions to:
split a multimedia item, received at a computer, into a media component and a text component;
retrieve text information relevant to text data from the text component using a query;
summarize the text information into a text factoid;
check source data of the media component for an image;
generate a current state image based on the image;
combine the text factoid and the current state image into a multimedia factoid; and
store the multimedia factoid for sending the multimedia factoid to a media outlet for presentation on a media format;
generate multiple images related to the image based on the source data of the image;
input the multiple images into a neural network;
determine differences between the multiple images;
generate a vector for topics based on the determined differences;
convert words associated with the topics into sentences to generate topic model sentences, and generating final sentences; and
use the final sentences in the combining of the factoid and the current state image in the combined factoid.

21. A computer-implemented method for automatic retrieval of multimedia data and generation of a relevant factoid(s) related to the multimedia data, comprising:
splitting a multimedia item, received at a computer, into a media component and a text component;
retrieving text information relevant to text data from the text component using a query;
summarizing the text information into a text factoid;
checking source data of the media component for an image;
generating a current state image based on the image;
combining the text factoid and the current state image into a multimedia factoid;
storing the multimedia factoid for sending the multimedia factoid to a media outlet for presentation on a media format;
receiving media items, at the computer, the media items each having a multimedia component and a text component;
splitting each of the media items into a multimedia component and a textual component, respectively;
converting textual data from the textual component into a query for each of the media items;
retrieving text information relevant to the textual data using the query for each of the media items;
summarizing the text information for each of the media items into factoids, respectively;
checking current date and weather conditions for images from multimedia components for each of the media items;
generating a current state image based on each of the images;
combining the factoids and the current state images into a combined factoid for each of the media items; and
sending the combined factoids to one or more media outlets for presentation on one or more media formats.

* * * * *